United States Patent

Stauder et al.

[15] 3,636,390
[45] Jan. 18, 1972

[54] EXPLOSIVE PULSE GENERATOR

[72] Inventors: Bob E. Stauder; William O. Christianson, both of Tulsa, Okla.

[73] Assignee: Dorsett Electronics, A Division of La Barge, Inc., Tulsa, Okla.

[22] Filed: Jan. 26, 1970

[21] Appl. No.: 5,629

[52] U.S. Cl. .................................................310/14, 290/1
[51] Int. Cl. ...........................................................H02k 35/02
[58] Field of Search ...........................310/12–15; 290/1

[56] References Cited

UNITED STATES PATENTS

| | | | |
|---|---|---|---|
| 2,544,077 | 3/1951 | Gardner | 310/15 |
| 3,105,153 | 9/1963 | James, Jr. | 290/1 |
| 3,116,428 | 12/1963 | Blodgett et al. | 310/15 |
| 3,257,905 | 6/1966 | Weisman et al. | 310/14 X |
| 3,259,769 | 7/1966 | Stott | 310/14 |
| 3,337,760 | 8/1967 | Allport | 290/1 X |
| 3,500,078 | 3/1970 | Buser et al. | 310/13 |

Primary Examiner—D. F. Duggan
Attorney—Head & Johnson

[57] ABSTRACT

This invention relates to a power supply for generating an electrical pulse. More particularly, the invention is a power supply for generating an electrical pulse including a housing, a coil of wire supported by the housing, a magnetic member supported by the housing and removable relative to the coil, and an explosive element having an igniter cap which, when physically distorted, ignites the explosive element, the explosive element being carried by the body and arranged to move the magnetic member by explosive force to induce a voltage pulse in the coil.

2 Claims, 6 Drawing Figures

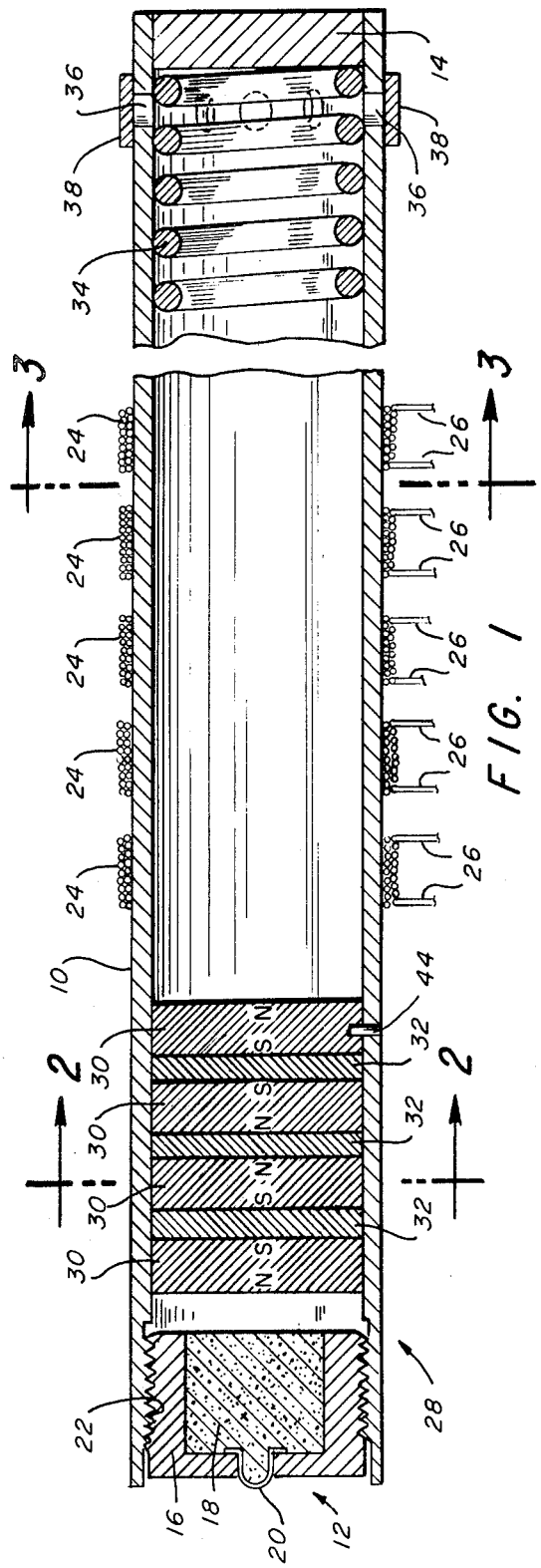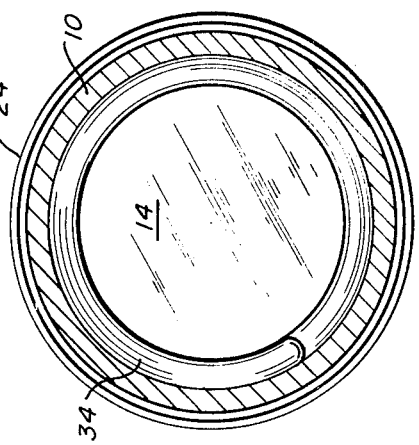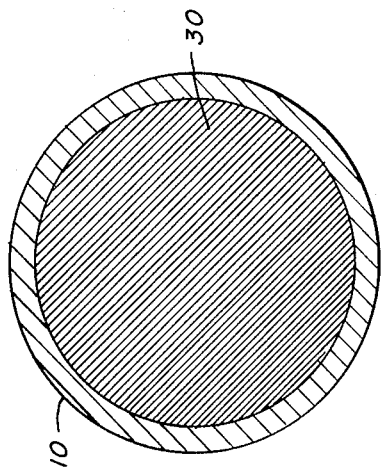

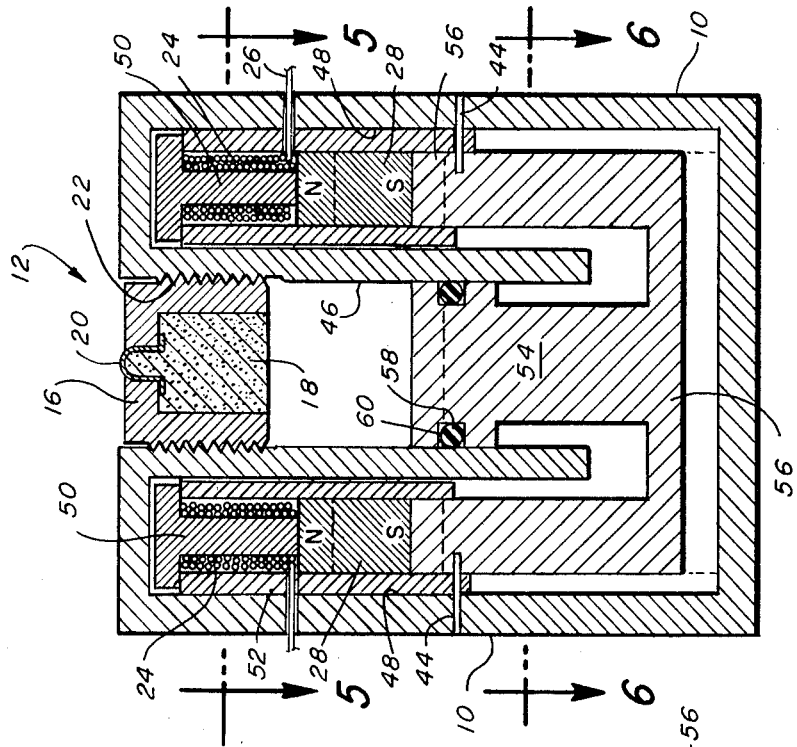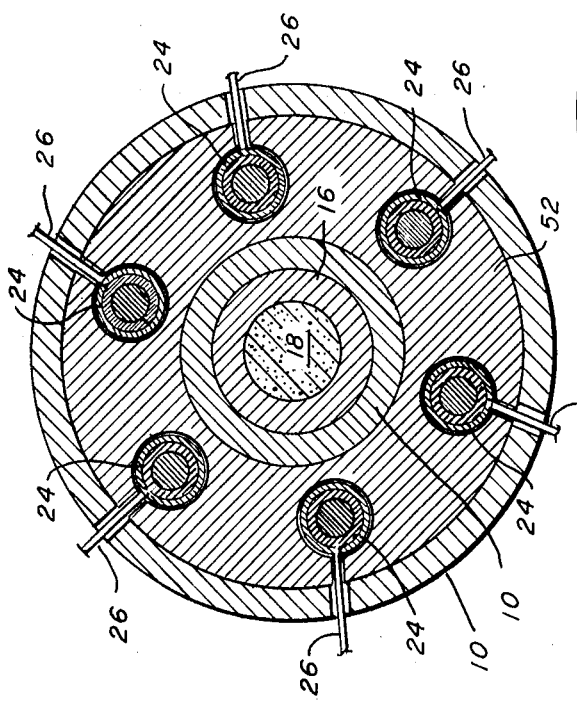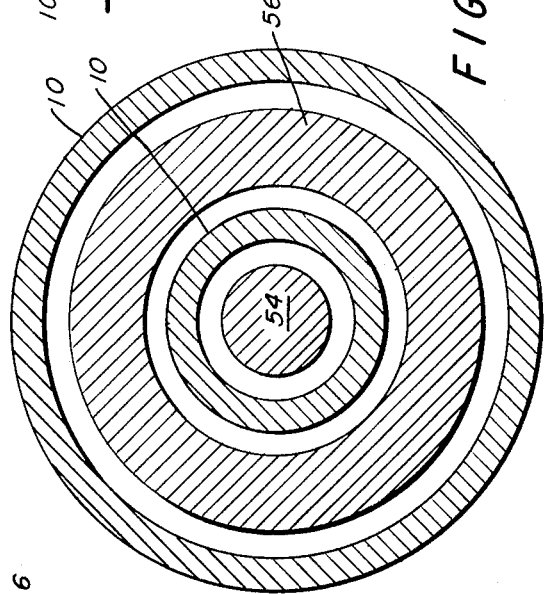

3,636,390

EXPLOSIVE PULSE GENERATOR

BACKGROUND AND OBJECTS OF THE INVENTION

It is frequently necessary to provide an electrical voltage pulse for initiating a system event or sequence. As an example, pilot ejecting devices require a voltage pulse to actuate a sequence of events as a part of a pilot escape system. Obviously, voltage pulses can be initiated utilizing electrical energy available from the aircraft electrical system. However, in order for the pilot escape system to be completely dependable it must be designed to function in the event of failure of the aircraft electrical system. Batteries may be utilized as a backup or supplement to an aircraft electrical system, however, every known type of battery has a limited life, and in any event, any accidental current leakage soon dissipates a battery. Therefore batteries are undesirable since they must be frequently checked to assure their ready state.

It is an object of this invention to provide a power supply for generating an electrical pulse which can be utilized, by way of example, in an aircraft pilot ejection system to produce a voltage pulse when desired independent of the aircraft electrical system.

Another object of this invention is to provide a power supply for generating an electrical pulse which remains dependable for an unlimited length of time and which does not have to be periodically checked to ascertain that it is in a ready state.

Another object of this invention is to provide a device for generating an electrical pulse upon the physical distortion of an igniter cap.

Another object of this invention is to provide a device for producing a timed spaced sequence of electrical pulses upon physical distortion of an igniter cap.

These general objects as well as more specific objects of the invention will be understood by reference to the description and claims, taken in conjunction with the attached drawings.

DESCRIPTION OF THE VIEWS

FIG. 1 is a cross-sectional view of one embodiment of this invention.

FIGS. 2 and 3 are cross-sectional views taken along the lines 2—2 and 3—3 respectively of FIG. 1.

FIG. 4 is a cross-sectional view of a different embodiment of the invention.

FIGS. 5 and 6 are cross-sectional views taken along the lines 5—5 and 6—6 respectively of FIG. 4.

DETAILED DESCRIPTION

Referring to FIGS. 1, 2 and 3, an embodiment of the invention is illustrated. An elongated tubular housing 10 is shown having an explosive element generally indicated by the numeral 12 at one end thereof, the other end being closed by a plug 14. The explosive element 12 may be in the form of a hollow retainer 16 holding an explosive charge 18. A cap 20 in one end of the retainer 16 ignites the explosive charge 18 when the cap is deformed, such as when struck by a firing pin. The explosive element 12 is of a known arrangement as used in many types of ammunition for firing a projectile, such as a shotgun shell. The explosive element 12 may be externally threaded as illustrated and received by internal threads 22 in the end of housing 10 or it may be otherwise affixed in the end of housing 10.

Received about housing 10 are a plurality of coils 24, five of such coils being illustrated. Only one coil 24 may be utilized, or any desired number, and the length of a single coil, or any number of coils, may be as desired. Each of the coils 24 includes output conductors 26 across which a voltage pulse is produced by the apparatus when actuated as will be described subsequently.

Within the tubular housing 10 is a magnetic member generally indicated by the numeral 28. Magnetic member 28 is formed of a material which has a permanent magnetic field established therein. The magnetic element 28 may be a single cylindrical element having a north plurality at one end and south plurality at the other, or as in the illustrated arrangement, the magnetic element 28 may consist of a plurality of magnetic discs 30, there being four illustrated, separated by nonmagnetic discs 32. The purpose for utilizing a plurality of spaced magnetic discs 30 is to impart a sequence of voltage pulses in each coil 24 on each passage of the magnetic member 28, whereas the use of a single magnetic element having a single north and south pole produces a single voltage pulse on each passage of a coil 24.

A spring 34 is received within housing 10 at the end opposite the explosive element 12. The function of spring 34 is to receive and absorb the kinetic energy of magnetic member 28 as it travels away from explosive element 12. Other purposes of spring 34 will be set forth in connection with the description of the operation of the device.

Optionally included in housing 10 is a gas discharge opening or openings 36 as illustrated, spaced adjacent to the end of the housing 10 having plug member 14. Openings 36 are preferably closed with a frangible cover 38, such as tape or the like, the cover 38 being rupturable by gas pressure within the housing 10 but serving to prevent foreign objects and contamination from entering the housing prior to the use of the device.

OPERATION OF EMBODIMENT OF FIGS. 1, 2 AND 3

The drawings show the device in its normal state, that is, the ready condition in which it rests until actuated to generate a voltage pulse, or voltage pulses. It can be seen that the apparatus may remain in ready state for an indefinite period, even including many years, without deterioration. The firing of explosive elements of the type exemplified by element 12 is, by present technology, an extremely dependable event. The device does not have to be checked or otherwise tested to ascertain its ready state. There are no batteries or capacitors to discharge or deteriorate and the generation of a voltage pulse is not dependent upon any other electrical system or device.

To actuate the device for generation of one or more voltage pulses, all that is necessary is that a firing pin, such as utilized in a rifle or shotgun, physically engages cap 20. The physical distortion in cap 20 results in the ignition of explosive charge 18 with the resultant immediate production of a large gas volume. The sudden increase in gas pressure by the firing of explosive element 12 causes the magnetic member 28 to be projected within housing 10 away from element 12 and towards the opposite end of the housing. As the magnetic member 28 moves within housing 10 it passes coils 24 inducing a voltage by the effect of the cutting of the wires of the coils 24 by the magnetic field emanating from the magnetic element 28. If magnetic element 28 is of a single element having one north and one south pole, a single voltage pulse is induced in each coil by the passage of the element. If, as illustrated, the magnetic element includes a plurality of separate magnetic discs 30 there is a voltage pulse produced by each of the discs 30. Where the pluralities of magnetic discs 30 are reversed, as shown in FIG. 1, the plurality of the voltage pulses produced in each coil 24 will likewise be reversed.

By the provision of a plurality of spaced coils 24, as illustrated, there is provided a sequence of pulses as magnetic element 28 moves from one end to the other of housing 10. This provides a time spaced sequence of voltage pulses. Any two or more of the pairs of conductors 26 may be connected in series or parallel arrangements for the production of electrical pulses of varying voltages, currents or durations.

If spring 34 is not utilized and if opening 36 is not provided, the magnetic member 28 will travel towards the plug 14 until the air pressure between the member 28 and plug 14 equals that between the element 28 and the element 12. The inertia of the magnetic element 28 will carry it further, compressing the air between it and the plug 14 to a pressure greater than that between the explosive element 12 and the magnetic member 28 which will result in the magnetic member 28 being stopped, and moved in the opposite direction. Thus, magnetic member 28 may oscillate back and forth by the effect of air pressure within the housing 10 after the device is actuated. To further insure such oscillation spring 34 may be provided to catch, absorb the inertial energy of the element 28, and return the element towards the explosive element 12.

If only a single passage of the magnetic member 28 is desired spring 34 is removed and opening 36 is provided as shown. When explosive element 12 is fired gas pressure pushes the magnetic member 28 towards the plug 14. As the gas pressure between the magnetic member 28 and plug 14 increases such pressure is exhausted through ports 36 so that the magnetic member 28 moves towards plug 14 within a buildup of air pressure. In addition, if it is desired to insure only one passage of magnetic member 28 other means may be provided for catching the magnetic member after it has passed coils 24, such as providing a tapered end of the body 10 adjacent the plug 14.

Magnetic element 28 may be held in its normal position such as by means of a small diameter pin 44 extending through housing 10 and into the magnetic element, the pin being easily sheared when explosive element 12 is actuated. The interior of housing 10 may be coated with a lubricant to insure the rapid and unrestricted movement of the magnetic element 28 upon firing of the explosive element.

EMBODIMENT OF FIGS. 4, 5 AND 6

Referring to FIGS. 4, 5 and 6, a different embodiment of the invention is shown. In this arrangement the housing 10 has a central opening 46 therein which receives the explosive element 12. As previously indicated with reference to the embodiment of FIG. 1, the explosive element 12 may be retained in position such as by means of internal threads 22 or it may be affixed to the housing in a variety of other ways. Housing 10 further includes a plurality of longitudinal openings 48 which are parallel to and spaced from central opening 46. Each of the longitudinal openings 48 includes a coil 24 in one end. Internally of each of the coils 24 is a paramagnetic material.

Received in central opening 46 is a piston member 54 and integrally affixed to the piston member is a yoke member 56. Supported to the yoke member are magnetic members 28, there being one magnetic member 28 for each coil 24. The magnetic members 28 are supported contiguous to the end of pole pieces 50 so as to impart a magnetic field to the pole pieces 50, and tubes 52, thus providing a magnetic field surrounding each coil 24.

OPERATION OF EMBODIMENT OF FIGS. 4, 5 AND 6

The arrangement of FIGS. 4, 5 and 6 show the embodiment in a rest position. Distorting the igniter cap 20 by a firing pin ignites explosive charge 18. The explosion forces piston 24 away from the explosive charge and downwardly within housing 10 to the position shown in dotted outline, separating the magnetic members 28 from their position contiguous to pole pieces 50. This separation interposes a high dielectric space between the ends of magnetic element members 28 and pole pieces 50, substantially reducing the magnetic flux linking these two elements, resulting in a sudden decrease of the magnetic field surrounding coils 24. When this decrease of the magnetic fields takes place the lines of force cut coils 24 and introduces a voltage pulse in each of the coils.

To insure the displacement of piston member 54 upon the actuation of explosive element 28, an O-ring gasket 58 may be provided in a circumferential groove 60. In addition, to insure that piston and yoke portions will remain in their normal position as shown, shear pins 44 may be extended through the housing 10 and into the yoke portions 50, shear pins being easily sheared by actuation of explosive element 12.

The arrangement of FIGS. 4, 5 and 6 show a device which may include as many coils 24. In this arrangement the pulse produced by each coil is simultaneous with the actuation of explosive element 12 rather than sequential as in the arrangement of FIG. 1. Coils 24 of the arrangement of FIGS. 4, 5 and 6 may be connected in series or parallel to produce high-voltage or high-current pulses as desired. Obviously the coils 24 may be grouped in sets to produce varying voltages and currents for different circuit applications as needed.

Two embodiments of the invention have been illustrated to show the range of configurations which the invention may take. It is obvious that many other alternate embodiments may be utilized keeping within the scope of the invention. While the invention has been described with a certain degree of particularity it is manifest that many changes may be made in the details of construction and the arrangement of components without departing from the spirit and scope of this disclosure. The invention is not to be limited to the illustrated embodiments but is to be limited only by the scope of the attached claim or claims, including the full range of equivalency to which each element or step thereof is entitled.

What is claimed:

1. A power supply for generating electrical pulses comprising:
    a housing having a central opening therein and a plurality of longitudinal openings therein parallel and spaced from said cylindrical opening;
    a coil received in each of said longitudinal openings;
    a yoke member received in said housing and having a piston portion extending in said housing cylindrical opening and a portion extending in each of said longitudinal openings;
    a magnetic member in each of said longitudinal openings affixed to said portion of said yoke member extending therein, each of the said magnetic members being movable relative to each of said coils in corresponding longitudinal openings by the movement of said yoke member; and
    an explosive element positioned in said body cylindrical opening including an igniter cap whereby said explosive element is ignited by the physical distortion of said igniter cap, said explosive element causing, when ignited, gas pressure acting upon said piston portion of said yoke to displace said yoke away from said explosive element and said magnetic members away from said coils to thereby induce voltage separately in each of said coils.

2. A power supply according to claim 1 wherein said cylindrical opening has internal threads in a portion of the internal surface and wherein said explosive element is threadably positioned in said threaded opening.

* * * * *